US007978096B2

(12) United States Patent
Reed et al.

(10) Patent No.: US 7,978,096 B2
(45) Date of Patent: Jul. 12, 2011

(54) PARKING ANGLE DETERMINATION AND CROSS TRAFFIC ALERT

(75) Inventors: Eric L. Reed, Livonia, MI (US); Brian Bennie, Sterling Heights, MI (US); Steven Y. Schondorf, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 329 days.

(21) Appl. No.: 12/431,145

(22) Filed: Apr. 28, 2009

(65) Prior Publication Data

US 2010/0271237 A1    Oct. 28, 2010

(51) Int. Cl.
*G08G 1/14* (2006.01)
(52) U.S. Cl. .................................................. 340/932.2
(58) Field of Classification Search .................. 340/903, 340/932.2, 435, 438, 425.5; 701/28, 41, 701/42, 301; 180/168, 169
See application file for complete search history.

(56) References Cited

U.S. PATENT DOCUMENTS

| 6,611,744 | B1 * | 8/2003 | Shimazaki et al. ............. 701/41 |
| 7,024,286 | B2 * | 4/2006 | Kimura et al. ..................... 701/1 |
| 7,640,108 | B2 * | 12/2009 | Shimizu et al. ............... 701/301 |
| 7,940,193 | B2 * | 5/2011 | Yamanaka ................. 340/932.2 |
| 2008/0174452 | A1 * | 7/2008 | Yamamoto et al. ........ 340/932.2 |
| 2009/0045928 | A1 | 2/2009 | Rao et al. |

* cited by examiner

*Primary Examiner* — Brent Swarthout
(74) *Attorney, Agent, or Firm* — Frank A. MacKenzie; MacMillan, Sobanski & Todd, LLC

(57) ABSTRACT

The subject of the present invention is a vehicle that determines a parking angle while parking and employs the parking angle when using a cross traffic alert system while backing out of a parking space. The parking angle is used to determine areas of interest and areas not of interest within the fields of view of vehicle mounted sensors. The areas of interest are those used to determine if cross traffic alerts need to be issued.

14 Claims, 3 Drawing Sheets

PARKING ANGLE DETERMINATION AND CROSS TRAFFIC ALERT

BACKGROUND OF THE INVENTION

The present invention relates generally to a vehicle having a rear crossing path detection and warning system and method for assisting vehicle operators in backing out of parking spaces.

Vehicle technologies that assist drivers with parking may increase convenience and safety for vehicle operators. One such technology is cross traffic alert, which assists vehicle operators who are backing out of parking spaces by warning if cross traffic is approaching the back of the host vehicle on a potentially intersecting trajectory with the host vehicle. Such systems are somewhat limited in effectiveness, however, due to variations in parking space configurations, angles and parking lot infrastructure from one parking lot to the next. This makes the system somewhat less reliable in sorting out infrastructure and approaching vehicles where a driver alert is desired from extraneous/non-threatening objects where a false alert may be generated. Due to this limitation, a tradeoff is employed where some false alerts are allowed and are balanced against a possibility that some targets might be missed. This system tradeoff is undesirable for some vehicle operators, and hence, a more accurate system is desired.

SUMMARY OF THE INVENTION

An embodiment contemplates a method of parking angle determination and cross traffic alert for a host vehicle pulling into and backing out of a parking space, the method comprising the steps of: detecting when the host vehicle is in a parking lot mode, the parking lot mode including the host vehicle traveling in a forward direction; recording incremental vehicle angles traveled over corresponding incremental vehicle distances when the host vehicle is in the parking lot mode; detecting when the host vehicle has parked; calculating and storing a parking angle; detecting when the host vehicle is backing out of the parking space after detecting the vehicle parked condition; from a field of view of a first side sensor, determining a first side portion of interest where an object detected by the first side sensor will be considered for a cross traffic alert and a first side portion not of interest where an object detected by the first side sensor will not be considered for the cross traffic alert, with the size of first side portion of interest and the first side portion not of interest being based on the calculated parking angle; and activating the cross traffic alert when the vehicle is backing out of the parking space if an object is detected in the first side portion of interest.

An advantage of an embodiment is that the determination of the parking angle for the host vehicle allows for a more accurate cross traffic alert system for vehicle operators. Knowing the parking angle allows for an expanded field of view for the sensors, where the system focuses only on the portions of the expanded fields of view that are relevant for that particular parking angle. Accordingly, less false alerts and less possibly missed targets are achieved while an operator is backing out of a parking space, thus providing the operator with more confidence in warnings generated by the cross traffic alert system.

DETAILED DESCRIPTION

Figure 1:
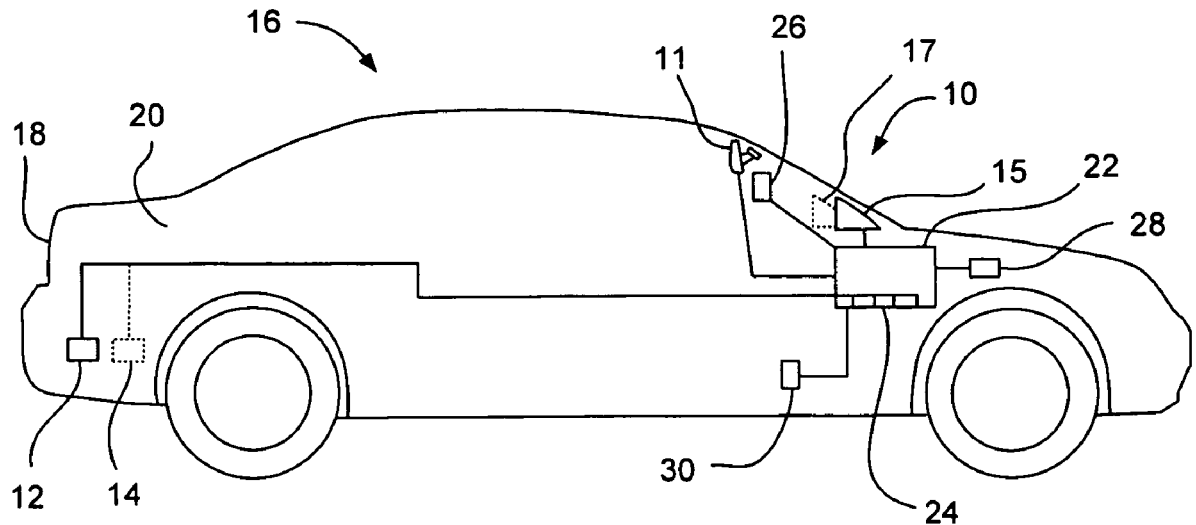
FIG. 1 shows a schematic, elevation view of a vehicle having a parking assist system.

FIG. 1 shows a host vehicle 16 that includes a parking assist system 10. The system 10 includes a pair of radar sensors, a right radar sensor 12 and a left radar sensor 14, one on each side 20 near the rear end 18 of the vehicle 16. The sensors 12, 14 communicate with an electronic control unit (ECU) 22 that may control the system 10. The host vehicle 16 may also include a right side view mirror 15, a left side view mirror 17 and a rear view mirror 11. One or more of the mirrors 11, 15, 17 may be in communication with the ECU 22 and may include a visual or audio alert capability that can be activated by the ECU 22 for rear crossing path warnings when the vehicle 16 is backing up. Alternatively, or in addition, an instrument panel alarm 26 may be in communication with the ECU 22 that includes a visual, audible or other alert capability that can be activated by the ECU 22 for rear crossing path warnings. A vehicle turning sensor 28, such as a yaw sensor or steering angle sensor is in communication with the ECU 22, as well as a vehicle distance sensor 30, such as an odometer.

The ECU 22 may include memory 24, such as PROM, EPROM, EEPROM, Flash, or other types of memory, which may include data tables stored therein. The ECU 22 may include multiple separate processors in communication with one another and may be made up of various combinations of hardware and software as is known to those skilled in the art.

Figure 2:
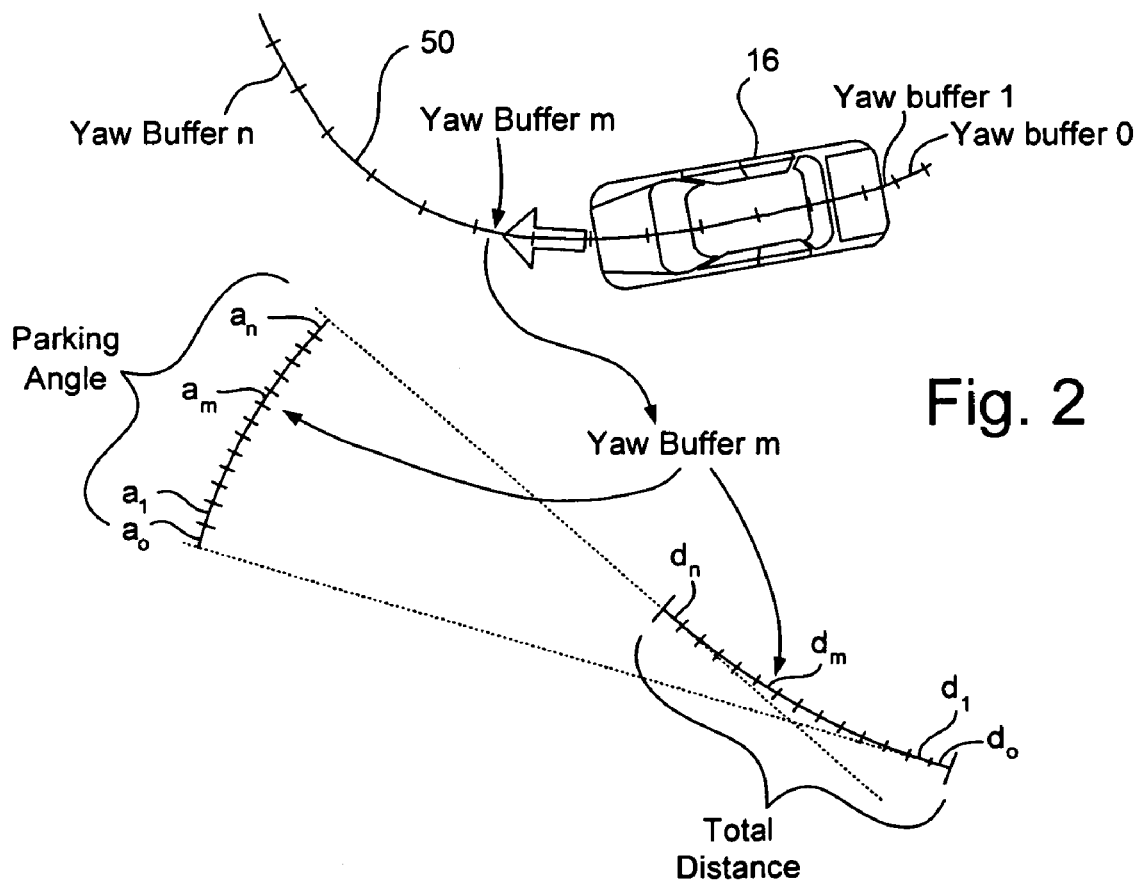
FIG. 2 shows a schematic diagram illustrating a portion of a method that can be employed for parking angle determination.

FIG. 2 is a schematic diagram illustrating parking angle determination. As the host vehicle 16 travels along a path 50 while in an angle detection mode, yaw information is stored in yaw buffers, each corresponding to a particular buffer distance. That is, as the host vehicle 16 travels the over the buffer distance $d_0$, the yaw rate is measured and stored in yaw buffer 0, as the host vehicle 16 travels over the buffer distance $d_1$, the yaw rate is measured and stored in yaw buffer 1, and as the host vehicle 16 travels over the buffer distance $d_m$ ($0<=m<=n$), the yaw rate is measured and stored in yaw buffer m. This continues through yaw buffer n, with the yaw rate at n+1 overwriting yaw buffer 0 so the last n yaw rates will be recorded, with one yaw rate for each corresponding buffer distance. From the buffer distance and yaw rate information for each buffer, an angle traversed for each buffer distance can be determined and recorded. That is, an angle traversed $a_0$ is determined for buffer distance $d_0$, an angle traversed $a_m$ is determined for buffer distance $d_m$, etc. up to $a_n$. The distance the host vehicle 16 travels may be measured by an odometer or by a product of the instantaneous vehicle speed and the message periodicity.

The parking angle of the host vehicle 16 is determined over a total distance, with the total distance=$n*(d_0+d_1+ \ldots +d_m+ \ldots d_n)$. For example if the buffer distance is one meter and there are fourteen buffers (i.e., n=14), then the total distance is fourteen meters. The buffer distance (one meter), the total distance (fourteen meters), and the number of buffers (14) are just examples, and the actual distances and number of buffers may be somewhat more or less, if so desired. The parking angle of the host vehicle 16 is the summation of the angle traversed information $a_0$ to $a_n$ (for the last 14 angle traversed calculations). That is, the parking angle=$a_0+a_1+ \ldots +a_m+ \ldots +a_n$.

As an alternative, a steering angle can be measured and used instead of the yaw rate. Some vehicles will already have one or the other measurement capability (yaw rate or steering angle) that are used in vehicle stability control or other systems and so no additional cost for an extra sensor is incurred. Either way, the end result is a parking angle determination for the host vehicle 16.

Figure 3:
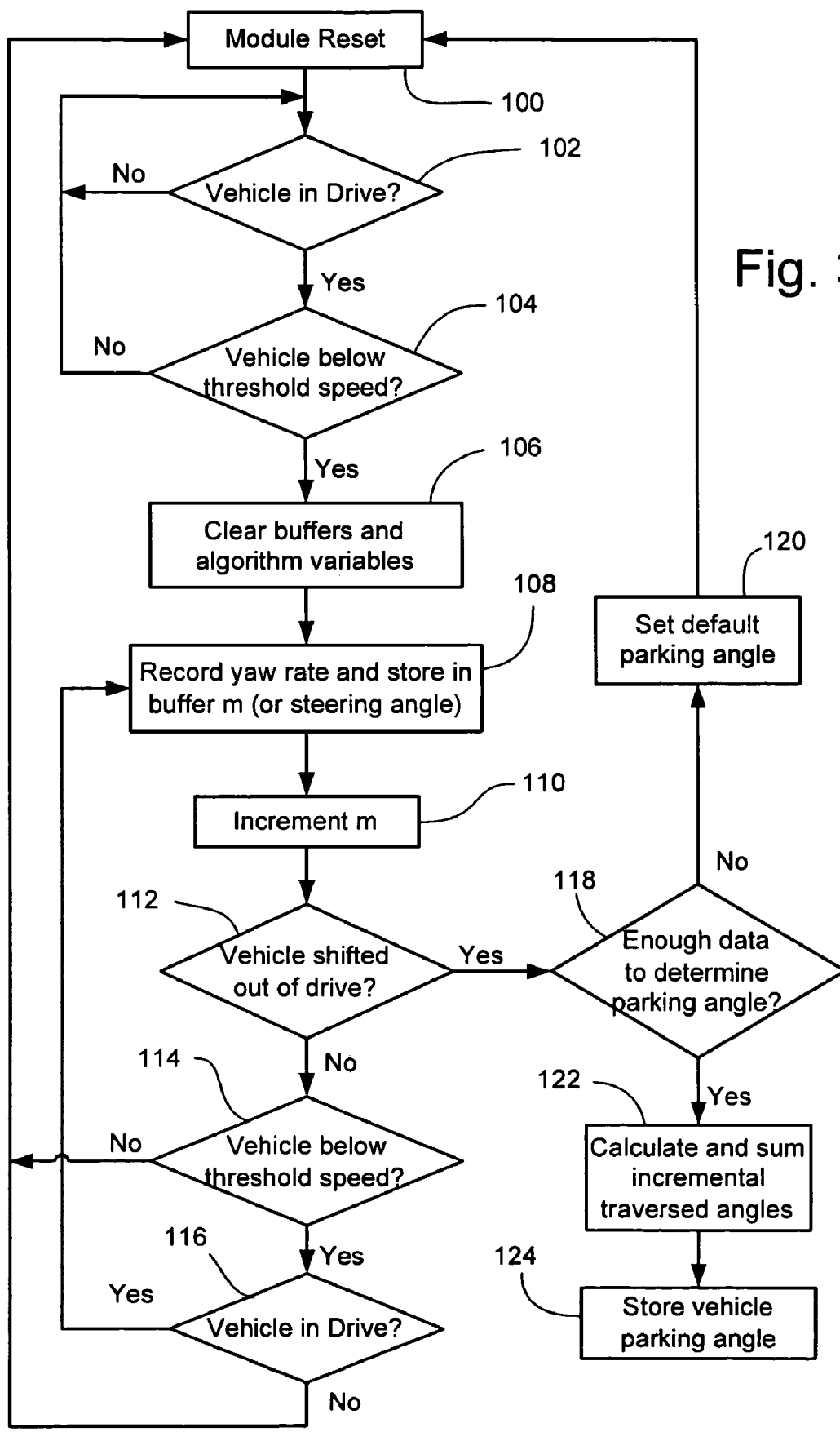
FIG. 3 is a flow chart illustrating a process that may be carried out by the parking assist system of FIG. 1 that forms a portion of the parking angle determination and assist method.

FIG. 3 is a flow chart whose process may be carried out by the ECU 22 in the parking assist system 10 of FIG. 1. The process may begin with a module reset, block 100. A determination is made as to whether the vehicle is in drive, block 102. If not, then no angle parking information is used. If it is in drive, then a determination is made whether the vehicle is below a threshold speed, block 104. The vehicle speed may be measured by a vehicle speedometer or by other means. This threshold speed is meant to represent the maximum speed at which a vehicle will travel when in a parking lot and preparing to pull into a parking space. For example, this speed may be about twenty kilometers per hour—although, this threshold may be somewhat higher or lower, if so desired. Above this threshold speed, parking angle information is not used. If the vehicle is traveling forward below this threshold speed, then an angle detection mode is entered and an initial clearing of buffers and algorithm variables may occur, block 106.

As the vehicle travels over a predetermined incremental distance ($d_m$) the yaw rate (or steering angle, as the case may be) is recorded and stored in buffer m, where m is a number between zero and n, with n being the number of buffers used (see discussion relative to FIG. 2). Then m is incremented by one, block 110, with m at n+1 starting over at zero so the most recent reading overwrites the oldest recorded yaw rate when the buffers are full.

A determination is made as to whether the host vehicle 16 is shifted out of drive, block 112, such as, for example, shifting into park. If not, then a determination is made as to whether the vehicle is still below the threshold speed, block 114. If not, then the routine returns to module reset, block 100. If it is still below the threshold speed, then a determination is made as to whether the vehicle is still in drive, block 116. If not, then the routine returns to module reset, block 100. If it is, then the routine returns to block 108 to continue recording yaw rates.

If the host vehicle is shifted into out of drive, block 112, then a determination is made as to whether there is enough data to determine a parking angle, block 118. For example, if the yaw rate is recorded for only one or two buffers, then not enough data is available to determine the park angle, so a default parking angle is set, block 120, and the process returns to module reset 100. If there is enough information to determine the parking angle, block 118, then the incremental traversed angles ($a_0$ to $a_n$) are calculated and summed (see discussion relative to FIG. 2) to obtain the vehicle parking angle. The calculated vehicle parking angle is stored, block 124. This parking angle may then be used in a parking assist routine, such as, for example, cross traffic alert when a vehicle is backing out of a parking space.

Figure 4:
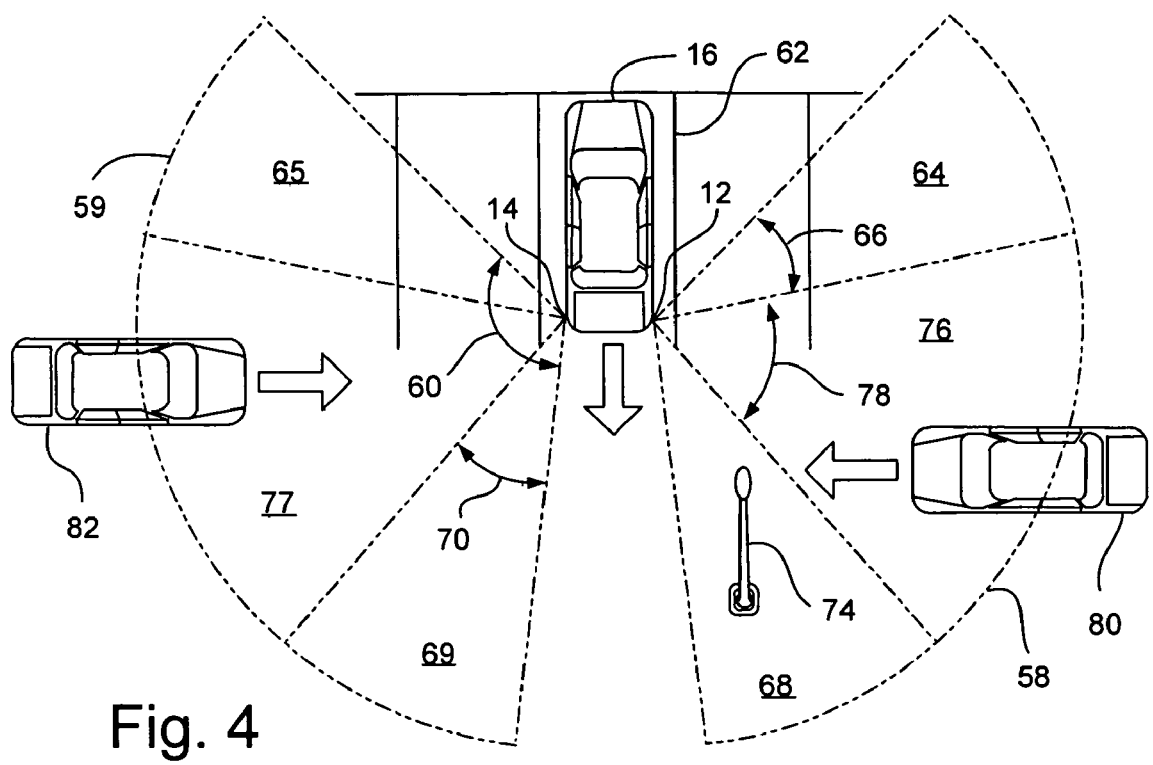
FIG. 4 is a schematic, plan view of a vehicle parking situation.

FIG. 4 shows an example of a parking situation where the parking angle may be employed to improve a cross traffic alert process. For this example, the parking angle for this parking space 62 is ninety degrees to the cross traffic, as would have been determined during vehicle parking (employing the method described relative to FIGS. 2 and 3) and stored in an electronic control unit, such as ECU 22 in FIG. 1.

When the host vehicle 16 is put into reverse gear, the radar sensors 12, 14 are activated to detect objects that may be in the path of the host vehicle 16 or may be on a trajectory to cross paths with the host vehicle 16. The radar sensors 12, 14 preferably have wide right and left sensor fields of view 58, 59, respectively, with each having a large total view angle 60. The phantom lines in FIG. 4 (and FIG. 5) represent fields of view for the sensors 12, 14. Because the parking angle is known, it is also known for this particular parking angle that parts of this total viewing angle 60 are not needed for cross traffic alert. Thus, a right forward portion 64 and a left forward portion 65 of the total fields of view 58, 59, respectively, each having a small forward view angle 66, are areas where detected objects are ignored. Also, a right rear portion 68 and a left rear portion 69 of the total fields of view 58, 59, respectively, each having a small rear view angle 70, are areas where detected objects are ignored. For example, infrastructure, such as a lamp post 74, may be ignored.

What remains are a right portion of interest 76 and a left portion of interest 77, each having a view angle 78 that is smaller than the total viewing angle 60 but large enough to cover the areas of interest within the total field of view. For example, a first target vehicle 80 may be in the right portion of interest 76, which may trigger a cross traffic alert. A second target vehicle 82 may be in the left portion of interest 77, which may trigger a cross traffic alert. Knowing the parking angle, then, allows the areas of interest for cross traffic alert to be determined and also allows the areas that are not of interest to be ignored. By ignoring particular portions of the field of view, nuisance alerts can be significantly reduced while not compromising the field of view where object detection is more important.

Alternatively, or in addition to the above, if the radar sensors are part of a multi-beam system, then the beam pattern may be adjusted to increase the energy directed toward the areas of interest while the beam energy directed toward the areas not of interest is reduced.

Figure 5:
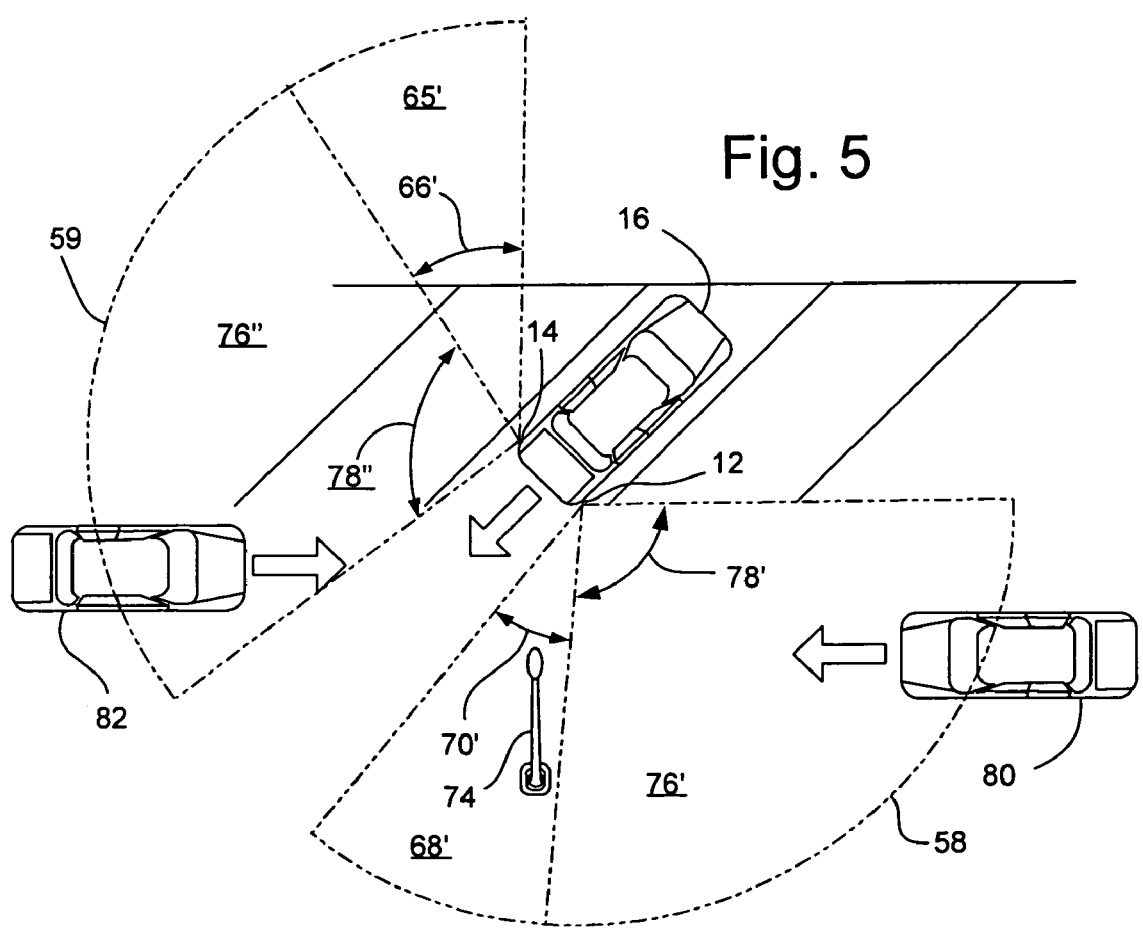
FIG. 5 shows a schematic, plan view of another vehicle parking situation.

FIG. 5 shows an example of another parking situation where the parking angle may be employed to improve the cross traffic alert process. For this example, the parking angle is about 45 degrees from the direction of flow of cross traffic. For this parking angle, when the host vehicle 16 is put into reverse gear, the radar sensors 12, 14 are activated to detect objects that may be in the path of the host vehicle 16 or may be on a trajectory to cross paths with the host vehicle 16.

Since the host vehicle 16 is now at an angle other than a normal angle to the cross traffic, the areas of interest and the areas not of interest for cross traffic are not symmetrical on the right and left sides of the host vehicle 16. On the right side of the host vehicle 16, the right wide field of view 58 sensed by the right sensor 12 may now be broken down into only two portions, a right rear portion 68', having a rear view angle 70', where detected objects are ignored, and a right portion of interest 76', having a view angle 78', where detected objects are of interest for cross traffic alert purposes. For example, the lamp post 74 may be ignored while the first target vehicle 80 may trigger a cross traffic alert.

On the left side of the host vehicle 16, the left wide field of view 59 sensed by the left sensor 14 may also now be broken down into only two portions, a left forward portion 65', having a forward view angle 66', where detected objects are ignored, and a left portion of interest 76", having a view angle 78", where detected objects are of interest for cross traffic purposes. For example, the second target vehicle 82 may trigger a cross traffic alert. Of course, for both the left and right sides, the wide fields of view 58, 59 may still be broken down into three portions, depending upon the angle at which the host vehicle 16 is parked and the determination as to how large of an angle the areas of interest 76, 77 should cover.

While certain embodiments of the present invention have been described in detail, those familiar with the art to which this invention relates will recognize various alternative designs and embodiments for practicing the invention as defined by the following claims.

What is claimed is:

1. A method of parking angle determination and cross traffic alert for a host vehicle pulling into and backing out of a parking space, the method comprising the steps of:
   (a) detecting when the host vehicle is in a parking lot mode, the parking lot mode including the host vehicle traveling in a forward direction;
   (b) recording incremental vehicle angles traveled over corresponding incremental vehicle distances when the host vehicle is in the parking lot mode;
   (c) detecting when the host vehicle has parked;
   (d) calculating and storing a parking angle;
   (e) detecting when the host vehicle is backing out of the parking space after detecting the vehicle parked condition;
   (f) from a field of view of a first side sensor, determining a first side portion of interest where an object detected by the first side sensor will be considered for a cross traffic alert and a first side portion not of interest where an object detected by the first side sensor will not be considered for the cross traffic alert, with the sizes of the first side portion of interest and the first side portion not of interest being based on the calculated parking angle; and
   (g) activating the cross traffic alert when the vehicle is backing out of the parking space if an object is detected in the first side portion of interest.

2. The method of claim 1 wherein the first side is a right side of the vehicle, the first side portion of interest is a right side portion of interest and the first side portion not of interest is a right side portion not of interest, and step (f) is further defined by:
   from a field of view of a left side sensor, determining a left side portion of interest where an object detected by the left side sensor will be considered for the cross traffic alert and a left side portion not of interest where an object detected by the left side sensor will not be considered for the cross traffic alert, with the sizes of the left side portion of interest and the left side portion not of interest being based on the calculated parking angle.

3. The method of claim 2 wherein step (g) is further defined by:
   activating the cross traffic alert when the vehicle is backing out of the parking space if an object is detected in the right side portion of interest or the left side portion of interest.

4. The method of claim 3 wherein step (g) is further defined by:
   not activating the cross traffic alert when the vehicle is backing out of the parking space if an object is detected in the right side portion not of interest or the left side portion not of interest but no object is detected in the right side portion of interest or the left side portion of interest.

5. The method of claim 1 wherein step (a) is further defined by:
   determining that the host vehicle is in parking lot mode if the host vehicle is in drive and the host vehicle is traveling less than a predetermined threshold speed.

6. The method of claim 1 wherein step (d) is further defined by:
   using a predetermined default angle for the parking angle if less than a predetermined number of incremental vehicle angles are recorded.

7. The method of claim 1 wherein step (b) is further defined by:
   clearing the recorded incremental vehicle angles if the host vehicle is detected as being out of the parking lot mode.

8. The method of claim 1 wherein step (g) is further defined by:
   activating a visual alert that is visible to a vehicle operator when the cross traffic alert is activated.

9. The method of claim 1 wherein step (g) is further defined by:
   activating an audio alert that can be heard by a vehicle operator when the cross traffic alert is activated.

10. The method of claim 1 wherein step (b) is further defined by:
    recording a vehicle yaw rate for each corresponding vehicle distance to determine the incremental vehicle angle traveled.

11. The method of claim 1 wherein step (b) is further defined by:
    recording a vehicle steering angle for each corresponding vehicle distance to determine the incremental vehicle angle traveled.

12. The method of claim 1 wherein step (d) is further defined by:
    only using the most recent n recorded incremental vehicle angles to calculate the parking angle, where n is a predetermined maximum number of recorded incremental vehicle angles.

13. The method of claim 1 comprising step (h):
    employing a multi-beam system as the first side sensor, and increasing an energy sent to the first side portion of interest while decreasing the energy sent to the first side portion not of interest.

14. The method of claim 1 wherein step (c) is further defined by:
    detecting when the host vehicle has parked by detecting that the host vehicle has been shifted out of drive.

* * * * *